United States Patent [19]

Oakes

[11] 4,452,671
[45] Jun. 5, 1984

[54] OIL SEPARATION AND HEAT RECOVERY SYSTEM

[75] Inventor: William J. Oakes, Chambersburg, Pa.

[73] Assignee: Nibble With Gibble's, Inc., Chambersburg, Pa.

[21] Appl. No.: 198,302

[22] Filed: Oct. 20, 1980

Related U.S. Application Data

[63] Continuation-in-part of Ser. No. 939,815, Sep. 5, 1978, abandoned, which is a continuation-in-part of Ser. No. 785,027, Apr. 6, 1977, Pat. No. 4,116,226.

[51] Int. Cl.³ ............................................. B01D 5/00
[52] U.S. Cl. ........................... 202/185 A; 98/115 R; 99/403; 126/299 D; 203/2; 203/11; 203/87; 203/95; 203/DIG. 14; 210/205; 210/257.1; 210/259; 210/294; 422/307; 422/900
[58] Field of Search ..................... 203/42, 87, 10, 11, 203/14, DIG. 14, 2, 99, 95, 92; 202/185 A, 202, 162, 234, 176, 205; 422/26, 307, 900; 426/438, 492; 126/299 D; 55/222, 223, 244, 269, DIG. 36; 98/115 K, 115 R; 210/294, 257.1, 259, 205; 99/403

[56] References Cited

U.S. PATENT DOCUMENTS

| 585,365 | 6/1897 | Skiffington | 202/185 A |
|---|---|---|---|
| 888,119 | 5/1908 | Richards | 202/185 A |
| 907,379 | 12/1908 | Laurent | 202/185 A |
| 2,350,111 | 5/1944 | Hood | 210/294 |
| 2,539,264 | 1/1951 | Murray | 422/26 |
| 2,629,690 | 2/1953 | Bauman | 210/294 |
| 2,767,095 | 10/1956 | Smith | 426/438 |
| 3,368,682 | 2/1968 | Boots | 210/257.1 |
| 3,616,437 | 10/1971 | Yagishita | 202/185 A |
| 3,835,796 | 9/1974 | Sanga | 55/244 |
| 3,889,581 | 6/1975 | Bray | 55/DIG. 36 |
| 3,965,004 | 6/1976 | Garber | 210/257.1 |
| 3,998,740 | 12/1976 | Bost et al. | 210/257.1 |
| 4,028,072 | 6/1977 | Braun | 203/42 |
| 4,116,226 | 9/1978 | Oakes | 203/87 |
| 4,159,227 | 6/1979 | Sundquist | 202/185 A |

Primary Examiner—Wilbur L. Bascomb, Jr.
Attorney, Agent, or Firm—Charles L Lovercheck; Wayne L. Lovercheck; Dale R. Lovercheck

[57] ABSTRACT

A recycle water treatment system for separating oil vapor from steam recovering the oil and heat from the steam and destroys microorganisms and exotoxins which incorporates an inclined duct connected to a barometric condenser with a container for oil at the lower end of the condenser. Oil entrained in the steam is carried up the duct and over the barometric condenser. The steam heats the condenser water that is recovered while the entrained oil flows back down the duct into a recovery container. The condenser water-steam condensate mixture is maintained at about 180° F. for a period of time sufficient to destroy microorganisms and exotoxins.

1 Claim, 2 Drawing Figures

OIL SEPARATION AND HEAT RECOVERY SYSTEM

REFERENCE TO PRIOR APPLICATION

This application is a continuation-in-part of U.S. patent application Ser. No. 939,815, filed Sept. 5, 1978, in the name of William J. Oakes now abandoned, which was a continuation-in-part of patent application Ser. No. 785,027, filed on Apr. 6, 1977, by the same inventor issued as U.S. Pat. No. 4,116,226.

GENERAL STATEMENT OF THE INVENTION

This invention relates to restaurant or commercial cooking equipment and more particularly to an improvement in containing the steam generated by such equipment for the purpose of heat recovery and oil extraction. Steam from commercial cooking equipment contains odors that exist from such cooking which are objectionable to neighboring establishments and residential areas. The steam is exhausted to the atmosphere in conventional equipment of this type. This permits oil droplets to be carried to the atmosphere and odors escape to the surrounding areas. Generally, no attempt is made to recover the heat energy contained in the steam. Also conventional equipment does not provide for pasteurization or recyclng of process water.

OBJECTS OF THE INVENTION

It is an object of the invention to provide an improved apparatus to recover oil from a vapor contained in steam and oil from a cooking process for reuse, rather than permitting it to escape into the ambient atmosphere, and, thereby, contaminating the atmosphere. The process further restricts the escape of odors from cooking processes, and destroys micro-organisms and exotoxins in water for reuse in a food processing system.

Another object of the invention is to provide a heat and oil recovery apparatus which is simple in construction, economical to manufacture, and simple and efficient to use.

Another object of the invention is to provide a water treatment system with recycling of process water which may be used in direct contact with food products.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
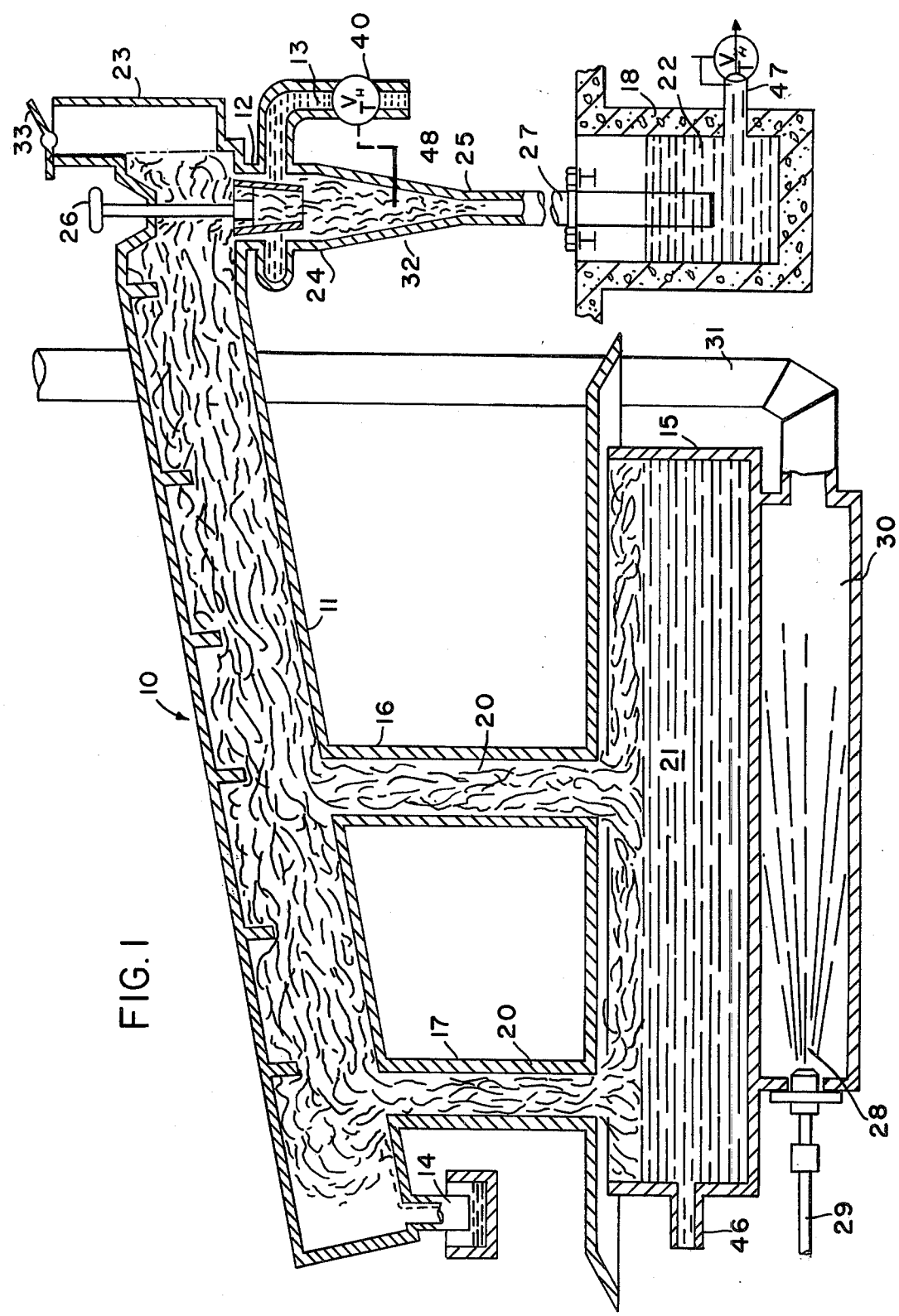
FIG. 1 is a diagrammatic view of the heat recovery apparatus according to the invention.

Now, with more particular reference to FIG. 1, the oil separation and heat recovery system is indicated generally at 10. It is made up generally of an inclined duct 11 connected at its upper end to the barometric condenser 32. A cold water inlet 13 is connected to the condenser and an oil outlet 14 is connected to the lower end of the duct. The steam and oil vapor 20 pass from the cooking medium 21 in the container 15 through ducts 16 and 17 and hot water from the condenser is collected in the container 18 and may be used for heating or as plant process water.

The container 15 is heated by a suitable means, for example, gas jet 28 supplied fuel by line 29. Hot gas in duct 30 heats the container 15 and carries out the cooking process. An air vent 31 acts as an exhaust for hot gases.

The duct work 16, 17 which leads from the container 15 into the inclined duct 11 and thence into the barometric condenser 32 provides a means of heating five pounds of water from 32° F. to 212° F. for every pound of steam condensed. The introduction of five pounds of cooling water through the cold water inlet 13 provides the means of absorption of heat of varporization of one pound of steam. Condensing one pound of steam to water results in a decrease in volume of that area in the condenser and creates a vacuum to induce movement of steam forward in the duct 11 to the condenser 32. The resulting heated water 22 in container 18 provides a supply of hot water for plant and process use. It also provides the means of recovering a large portion of that energy expended to heat the oil to the temperature required for cooking. In the light of the present energy shortage, the recovery effected by this invention becomes extremely important.

THE BAROMETRIC CONDENSER

The mixture of condensed steam or condensate, and cooling water combine and collect as hot water in container 18. The duct 11 is vented to the atmosphere by throttle 33, by vents at 23 to the pressure of the temperature. The barometric condenser 32 requires no pump, as the discharge is accomplished by the falling of the water in cone 24 under the effect of gravity. The exhaust steam enters the head of the condenser by way of the pipe 12 and is discharged down through the cone 24 into the tapered condensing chamber 25. The flow of injection water is controlled by valve 40. The injection water is led by a cold water inlet 13 into the ring-shaped chamber surrounding the cone 24 and is discharged downwards in a thin conical sheet through the narrow opening between the cone 24 and the wall of the condensing chamber 25. The size of this annular opening may be varied by raising or lowering the cone 24 by means of the hand wheel 26. The cooling water and the condensed steam fall down through the long pipe 27 and are discharged into the container 18 that seals the lower end of the discharge pipe.

The flow of injection water is controlled by thermostatic valve 40. The temperature sensing means 48 senses the temperature of the steam condensate and injection water mixture in chamber 25 is about 180° F. By using temperature sensing means 48' the thermostatic valve 40 regulates the injection water flow rate so that the water in container 18 is maintained at a pasteurizing temperature.

METHOD

It is the purpose of this invention to provide a means of effectively destroying microorganisms and their exotoxins in process water. Water so treated may be used in food processing.

The means to accomplish this additional treatment is a condensing system with direct contact of the water with a steam stream of sufficient thermal capability to bring the mixture of the water condensed from steam and the condensing water to 180° F. The time that the resulting water would be maintained at this temperature would exceed the time required to effect pasteurization by destruction of microorganisms and exotoxins.

DETAILED DESCRIPTION OF THE DRAWINGS

Figure 2:
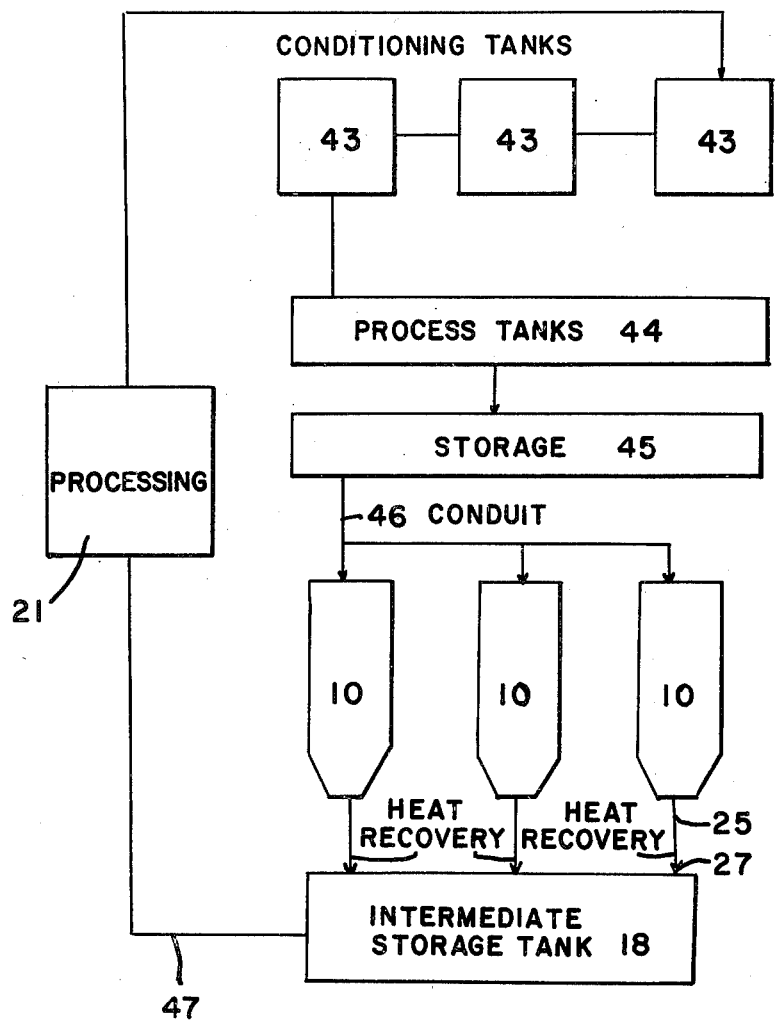
FIG. 2 is a diagrammatic view of the recycling system according to the invention.

Now, with more particular reference to FIG. 2. The oil separation and heat recovery systems 10 are each similar to the system 10 shown in FIG. 1, and feed water into intermediate tank 42 which serves as a source of sterilized, microbiologically clean water used for process water suitable for use in food processing. The numeral 21 indicates a food processing or similar unit.

After the water is used, for example, in food processing and before oil separation and heat recovery, the process water first passes through conditioning tanks 43, which may be settling tanks to settle out solids, process tanks 44 and unsterilized water storage tank 45. Process tanks 44 may be Zeolite water softeners of a type familiar to those skilled in the art. Tanks 44 are used to make the water industrially clean but do not kill the ordinary bacteria in the water.

Water from storage tank 45 stores unsterilized water for future use and is carried to oil separation and heat recovery systems 10 by conduit 46. Conduit 47 carries the water from the oil separation and heat recovery systems 10 to intermediate tank 42. Water from intermediate tank 42 is used as needed as process water for the food processing unit 21. The water from intermediate clean water storage tank 42 is suitable for use in direct contact with food.

The water boiling off as steam from the processing unit 21 is transferred through the conditioning tanks 43 to settle out any undesirable solids. The water from the conditioning tanks then flows to the process tank 44 where salts are neutralized and any entrained solid matter is let out. The water from the process tank 44 then flows through the unsterilized water tank 45 where it is stored and, as needed, flows through the line 46 to the oil separation and heat recovery systems 10 where the oil is removed from the water and the water from the oil separation and heat recovery system then flows through lines 47 to the microbiological intermediate tank 42, the water having been sterilized in the tank 10. The water from intermediate tank 42 then flows as needed to the processing tank 21 and the cycle begins again.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A system for producing sterilized water from an oil and water mixture comprising, a cooking process means, a settling tank (43), a water softener and filter (44), a storage tank (45) for industrially clean water, means for oil separation and for destroying micro-organisms and endotoxins (10) in said water thereby providing sterilized water and a second storage tank (42) for said sterilized water, said process means, settling tank (43), water softener and filter (44), first storage tank (45), means for separation of oil, heat recovery and destroying micro-organisms and exotoxins (10) and a second storage tank (42) all connected in series with each other and to said process means forming a continuous circuit, first means connecting said process means to said settling tank (43), second means connecting said settling tank to said water softener and filter (44), third means connecting said water softener and filter (44) to said first storage tank (45), fourth means connecting said first storage tank (45) to said means for separation of oil, heat recovery and destroying micro-organisms and exotoxins (10), fifth means connecting said means for separation of oil, heat recovery and destroying micro-organisms and exotoxins (10) to said second storage tank (42), sixth means connecting said second storage tank (42) to said process means whereby water from said process means is filtered, sterilized, oil separated therefrom, said oil separation, heat recovery and means for destroying microorganisms and exotoxins (10) comprising an inclined duct (11) having an upper end and a lower end, and heating means (29) to evaporate water to form steam and oil connected to said inclined duct (11), oil outlet means (14) on the lower end of said inclined duct (11), a barometric condenser (32) connected to the upper end of said duct, water inlet means (12) connected to said barometric condenser (32), said barometric condenser (32) being connected to said second storage tank (42), for condensing said steam whereby said steam from said duct is condensed into hot water and said hot water flows into said second storage tank for return to said process means.

* * * * *